United States Patent Office 3,205,207
Patented Sept. 7, 1965

3,205,207
SULFUR VULCANIZABLE OXETANE AND OXETANE-OXIRANE COPOLYMERS
Edwin J. Vandenberg, Wilmington, Del., assignor to Hercules Powder Company, Wilmington, Del., a corporation of Delaware
No Drawing. Filed Jan. 29, 1962, Ser. No. 169,586
10 Claims. (Cl. 260—88.3)

This invention relates to essentially linear, high molecular weight, sulfur-vulcanizable oxetane and oxetane-oxirane copolymers as new compositions of matter. More particularly, this invention relates to new elastomeric essentially linear polyethers of high molecular weight, which are copolymers derived from mixtures of different monomeric oxetanes, and from mixtures of monomeric oxetanes and monomeric oxiranes, at least part of the repeating units in said copolymers being derived from ethylenically unsaturated oxetanes and/or ethylenically unsaturated oxiranes, i.e., oxetanes and/or oxiranes having non-aromatic, carbon-to-carbon unsaturation within the molecule.

The principal object of the invention is to provide new elastomeric oxetane, and oxetane-oxirane copolymers from which superior vulcanized rubbery products can be prepared by conventional sulfur vulcanization.

This object and others are accomplished in accordance with this invention by the discovery of essentially linear, elastomeric, sulfur-vulcanizable polyether copolymers, the repeating units of which are derived solely from cyclic ethers selected from the class consisting of monomeric oxetanes, monomeric oxiranes, and mixtures thereof, at least about 0.5% and not more than about 50% by weight of said repeating units having at least one ethylenically unsaturated substituent group per repeating unit, the remainder of said repeating units having only substituent groups which are inert to sulfur vulcanization, at least 5% of said remainder of said repeating units being derived from monomeric oxetanes, said polyether having a weight average molecular weight of at least about 50,000. This usually corresponds to a reduced specific viscosity of at least about 1 measured on a 0.1% by weight solution of said polyether in chloroform at 25° C.

This invention, therefore, contemplates copolymers derived entirely from mixtures of monomeric oxetanes, as well as copolymers derived from mixtures of monomeric oxetanes and monomeric oxiranes, and the new copolymers of this invention may be binary copolymers, ternary copolymers, quaternary copolymers, etc.

It is a characteristic of the new copolymers of this invention that they are essentially linear elastomeric polyethers, consisting essentially of linear open chain alkylene ether repeating units, wherein the repeating units are linked or connected together by linear ether linkages from carbon on one repeating unit to oxygen on an adjoining repeating unit. Copolymerization of a mixture of oxetane monomers, therefore, involves only the characteristic oxetane ring therein, whereby a substantially linear polyether molecule is formed by opening of the oxetane ring in each monomeric oxetane molecule and joining of the plurality of the resulting acyclic repeating units by linear ether linkages. Similarly, copolymerization of a mixture of oxetane monomers and oxirane monomers involves only the characteristic oxetane and oxirane rings of the respective oxetane and oxirane monomers, whereby a substantially linear polyether molecule is formed by opening of the oxetane and oxirane rings in each of the respective oxetane and oxirane monomeric molecules and joining of the plurality of the resulting acyclic repeating units by linear ether linkages.

The new polyether copolymers of this invention may be prepared by contacting mixtures of oxetane monomers or mixtures of oxetane monomers and oxirane monomers with a catalyst formed by reacting an organoaluminum compound with from about 0.01 mole to about 2 moles of a chelating agent such as acetylacetone, trifluoroacetylacetone, ethoxyacetic acid, etc., and with from about 0.1 mole to about 1.5 moles of water per mole of the organoaluminum compound. Exemplary of the organoaluminum compounds that may be so reacted with a chelating agent and with water and used as the catalyst are triethylaluminum, tripropylaluminum, triisobutylaluminum, trioctylaluminum, diethylaluminum hydride, diisobutylaluminum hydride, etc. A typical catalyst for the purposes of this invention is the product obtained by reacting 1 mole of triethylaluminum with 1 mole of acetylacetone and with 0.5 mole of water.

It will be evident to those skilled in the art that the monomers employed in any particular polymerization should be added in such a manner as to yield uniform copolymers, and the particular method employed will depend on the copolymerization reactivity ratio of the monomers for each system. Depending on the requirements for uniform copolymerization the monomers may all be added at one time at the start of the polymerization, or they may be added continuously as the polymerization proceeds. In other cases it may be found advisable to add one or more of the monomers at the beginning of the polymerization, and another monomer continuously or at intervals as the polymerization proceeds.

The polymerization may be carried out under a considerable range of conditions by any desired means, either as a batch or continuous process. Preferably the polymerization reaction will be conducted under conditions which exclude excessive moisture and air, and this can be most conveniently accomplished in vessels closed to the atmosphere. Under conditions where diluent polymerization reactions are desired, the diluents of utility are those that do not react either with the monomers or the catalyst. Such diluents include, by way of example, aromatic hydrocarbons such as benzene, toluene, etc., saturated aliphatic hydrocarbons and cycloaliphatic hydrocarbons such as n-heptane, cyclohexane, etc., halogenated hydrocarbons such as chlorobenzene or haloalkanes such as methyl chloride, methylene chloride, chloroform, carbon tetrachloride, ethylene dichloride, tetrachloroethane, trifluoro-1,1,2-tribromoethane, etc., and ethers such as the dialkyl, aryl or cycloalkyl ethers as, for example, diethyl ether, dipropyl ether, diisopropyl ether, etc. Obviously, any desired mixture of such diluents may be used.

The polymerization reaction may also be carried out as a continuous bulk polymerization at elevated temperatures, usually in the range of polymer melt temperatures. For such bulk polymerizations the method described in U.S. Patent 2,994,668 has been found to be quite useful for preparing the new copolymers of this invention.

Polymerization temperature in accordance with this invention can be varied over a wide range from about −80° C. to about 300° C., suitable temperatures below about 100° C., for example, being convenient when conducting diluent polymerization reactions. Bulk polymerizations, however, will be preferably carried out at temperatures from about 100° C. to about 260° C., and particularly in the range of polymer melt temperatures.

The high molecular weight copolymers of this invention may be separated from the polymerization reaction mass by standard conventional procedures. The catalyst employed may be removed by appropriate treatments or it may simply be deactivated with an appropriate agent such as alcohol, water, air or ammonia and left in the final product. For example, when conducting diluent polymerizations, the polymer, if insoluble, may be collected, washed with an aqueous acid to extract catalyst residues, then washed free of acid with water, stabilized if necessary or desired, and then dried, usually in vacuo or in an inert atmosphere at any convenient temperature. If the copolymer is soluble in the polymerization reaction mixture, then the copolymer solution may be washed with an immiscible aqueous acid to extract catalyst residues, then washed free of acid with extractive water washes, stabilized if necessary or desired, and the copolymer recovered by evaporating the mixture to dryness, preferably in vacuo. In bulk polymerizations, the molten reaction mixture is either quenched in a polymer nonsolvent such as methanol, water and the like, or the mass may be cooled, ground, and if necessary or desired, washed and then dried as set forth above for treatment of polymer prepared by diluent polymerization.

Polymerization reaction time may be varied over a very wide range from a few minutes, for example, about 5 minutes, to several hours or even days with no detrimental effects under conditions where a prolonged reaction time is required or desired. Generally, diluent polymerizations require considerably longer reaction time than bulk polymerization at polymer melt temperatures.

The amount of catalyst employed to catalyze copolymerization of mixtures of oxetane monomers or mixtures of oxetane and oxirane monomers in accordance with this invention can range from a minute catalytic amount up to a large excess, and amounts from about 10 p.p.m. to about 100,000 p.p.m., based on total monomer weight, have been employed, the larger amounts in excess of about 15,000 p.p.m. having been employed in diluent polymerizations. In general, for bulk polymerizations the amount of catalyst employed will be within the range of from about 10 p.p.m. to about 15,000 p.p.m., based on the weight of monomers and preferably from about 100 p.p.m. to about 1,000 p.p.m. of catalyst based on the weight of the monomers. Impurities such as carbon dioxide, oxygen, aldehydes, alcohols, etc., which tend to react with the catalysts should be kept at as low a level as possible to minimize unnecessary catalyst consumption. However, irrespective of the type or conditions of polymerization chosen, the amount of catalyst employed will be sufficient to catalyze copolymerization of a mixture of oxetanes, or copolymerization of oxetanes with oxiranes to copolymers having a weight average molecular weight of at least about 50,000. As pointed out previously, expressed in terms of reduced specific viscosity, $\eta_{sp/c}$, this usually means a reduced specific viscosity of at least about 1, as measured on a 0.1% by weight solution of the polymer in chloroform at 25° C. Preferably, the reduced specific viscosity of these new copolymers should be at least about 2 to about 3.

In the expression $\eta_{sp/c}$ for defining reduced specific viscosity, the symbol $\eta_{sp}$ stands for specific viscosity and the symbol C stands for concentration of the polymer in the solution thereof in solvent expressed as grams per 100 ml. of solution. Specific viscosity, $\eta_{sp}$, is obtained by dividing the difference between the viscosity of the polymer solution and the viscosity of the solvent used therein by the viscosity of the solvent.

An essential characteristic of these new copolymers is the presence therein of at least about 0.5% and not more than about 50% by weight, preferably between about 1% and about 25% by weight, and still more preferably between about 2% and about 15% by weight, of repeating units having at least one ethylenically unsaturated substituent group per repeating unit, these unsaturated repeating units being derived from ethylenically unsaturated oxetanes and/or ethylenically unsaturated oxiranes. The amount required will vary with the particular unsaturated comonomer but will generally be that amount required to give good vulcanizate physical properties. Obviously mixtures of ethylenically unsaturated oxetanes and ethylenically saturated oxiranes may be used. Since the new copolymers of this invention contain ethylenic double bonds in side chains of the ethylenically unsaturated repeating units thereof, they are readily vulcanized with standard sulfur recipes to produce excellent rubbers.

A further necessary characteristic of these new copolymers is that they all contain at least 5% by weight of repeating units derived from monomeric oxetanes having only substituent groups which are inert to sulfur vulcanization, i.e., substituent groups which do not contain any non-aromatic, carbon-to-carbon unsaturation therein. Remaining repeating units, in addition to the above requirement for from 0.5% to 50% by weight of repeating units derived from ethylenically unsaturated oxetanes and/or ethylenically unsaturated oxiranes and the above requirement for at least 5% by weight of repeating units derived from monomeric oxetanes having only substituent groups which are inert to sulfur vulcanization, may be derived from either monomeric oxetanes, or monomeric oxiranes, or mixtures thereof, which contain only substituent groups which are inert to sulfur vulcanization, i.e., substituent groups which do not contain non-aromatic, carbon-to-carbon unsaturation.

Any monomeric oxetane having the following generalized structural formula:

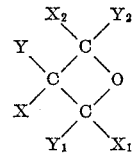

in which X, $X_1$, $X_2$, Y, $Y_1$, $Y_2$ is each a substituent which is inert, i.e., non-reactive, with the polymerization catalyst, is suitable for preparation of the new polyether copolymers of this invention.

The nature of the inert substituents $X_1$, X, $X_2$, $Y_1$, Y, $Y_2$ in the respective 2-, 3-, and 4-positions can be varied widely, and include hydrogen, the halogens, hydrocarbon radicals, halogenated hydrocarbon radicals, as well as the oxa-analogues of these hydrocarbon and halogenated hydrocarbon radicals. Thus, these radicals may be acyclic, cyclic, and mixed acyclic/cyclic radicals, such as aliphatic, cycloaliphatic, aromatic, and mixed aliphatic/aromatic radicals, which may contain, in addition to carbon and hydrogen, organically bonded halogen and oxygen atoms. The aliphatic and cycloaliphatic hydrocarbon portion of these radicals may be saturated or unsaturated acyclic or cyclic structures as exemplified by alkyl, cycloalkyl, mixed alkylcycloalkyl, and the corresponding radicals having non-aromatic carbon-to-carbon unsaturation as exemplified by alkenyl, cycloalkenyl, alkenylcycloalkyl, alkylcycloalkenyl, etc. In order that these substituents shall be inert, i.e., non-reactive, with the polymerization catalysts employed, they should not contain any groups which have Zerewitinoff hydrogen atoms, such as amino groups, hydroxyl groups, carboxylic acid groups, etc.

By way of example, but not in limitation of the invention, therefore, suitable X, $X_1$, $X_2$, Y, $Y_1$, and $Y_2$ substituents include, in addition to hydrogen, halogens including fluoro, chloro, bromo, and iodo substituent groups; alkyl, cycloalkyl, aryl and aralkyl groups such as methyl, ethyl, propyl, butyl, cyclohexyl, phenyl, benzyl, and the like; alkoxy, cycloalkoxy, aryloxy, aralkoxy groups, etc., such as methoxy, ethoxy, cyclohexyloxy, phenoxy, benzyloxy, and the like; alkyloxymethyl, cycloalkyloxymethyl, aryloxymethyl, aralkyloxymethyl groups, etc., such as methoxymethyl, ethoxymethyl, cyclohexyloxymethyl, phenoxymethyl, benzyloxymethyl, and the like; haloalkyl groups such as chloromethyl, bromoethyl, iodomethyl, fluoromethyl, chloroethyl, chloropropyl, and the like; haloalkyloxymethyl groups such as chloroethoxymethyl, bromoethoxymethyl, fluoropropoxymethyl, iodobutoxymethyl, and the like; ethylenically unsaturated alkenyl and alkenyloxymethyl radicals such as vinyl, propenyl, isopropenyl, allyl, methallyl, butenyl, allyloxymethyl, propenyloxymethyl, methallyloxymethyl, oleyl, and the like; and cycloaliphatic or aryl radicals containing an ethylenically unsaturated group and cycloaliphatic radicals containing an ethylenic double bond in the ring, as for example, 4-vinylcyclohexyl, α-terpinyl, γ-terpinyl, abietyl, cyclohexenylmethyl, o-allylphenyl, p-vinylbenzyl, and the like.

It is seen, therefore, that suitable substituents in the 2-, 3-, and 4-positions in the oxetane monomers include, without limitation all groups which are substantially non-reactive with the catalysts employed in this invention. As illustrative of some typical monomeric oxetanes which can be copolymerized to form the new high molecular weight polyether copolymers of this invention, but not in limitation of the invention, are such compounds as: oxetane, also designated as trimethylene oxide,

where all $X$, $X_1$, $X_2$, $Y$, $Y_1$, $Y_2$ substituents are hydrogen;
2-bromo oxetane;
2-methyloxetane;
2-cyclohexyloxetane;
2-benzyl oxetane;
2-methoxy oxetane;
2-phenoxy oxetane;
2-methoxyethyl oxetane;
2-benzyloxymethyl oxetane;
2-chloromethyl oxetane;
2-chloroethoxymethyl oxetane;
2-allyl oxetane;
2-vinylbenzyl oxetane;
2-vinyl oxetane;
2-allyloxymethyl oxetane, and the like;
2,2-bis(chloromethyl)oxetane;
2,2-bis(2-chloroethyl) oxetane;
2,2-dimethyl oxetane;
2-chloro-2-methyl oxetane;
2-fluoro-2-bromomethyl oxetane;
2-methoxy-2-methyl oxetane;
2-methallyl-2-methyl oxetane, and the like;
3-chloro oxetane;
3-ethyl oxetane;
3-cyclohexyl oxetane;
3-phenyl oxetane;
3-methoxy oxetane;
3-chloromethyl oxetane;
3-vinyl oxetane;
3-allyl oxetane;
3-allyloxymethyl oxetane, and the like;
2-methyl-3-methyl oxetane;
2-chloromethyl-3-bromo oxetane;
2-methoxymethyl-3-propyl oxetane;
2-methoxy-3-butenyl oxetane;
2-methallyloxymethyl-3-ethyl oxetane;
2-propenyl-3-bromoethyl oxetane, and the like;
3,3-bis(choloromethyl)oxetane;
3,3-bis(bromomethyl)oxetane;
3,3-bis(iodomethyl)oxetane;
3,3-bis(fluoromethyl)oxetane;
3,3-bis(2-chloroethyl)oxetane;
3-bromomethyl-3-chloromethyl oxetane;
3,3-dimethyl oxetane;
3,3-diethyl oxetane;
3,3-bis(chloro)oxetane;
3-chloro-3-chloromethyl oxetane;
3-bromo-3-ethyl oxetane;
3-fluoro-3-bromomethyl oxetane;
3-ethyl-3-methyl oxetane;
3-chloromethyl-3-ethyl oxetane;
3-chloromethyl-3-methyl oxetane;
3-methoxy-3-methyl oxetane;
3-ethyl-3-methoxymethyl oxetane;
3-ethoxymethyl-3-methyl oxetane;
3,3-bis(phenoxymethyl)oxetane;
3-vinyl-3-methyl oxetane;
3-allyl-3-chloromethyl oxetane;
3-isopropenyl-3-ethyl oxetane;
3-chloromethyl-3-(4-vinylcyclohexyl)oxetane;
3-methyl-3-methallyl oxetane;
3,3-bis(allyl)oxetane;
3-allyloxymethyl-3-methyl oxetane;
3-propenyloxymethyl-3-methyl oxetane;
3,3-bis(allyloxymethyl)oxetane, and the like;
2-vinyl-3,3-bis(chloromethyl)oxetane;
2-methoxy-3,3-bis(bromomethyl)oxetane;
2-vinylbenzyl-3,3-dimethyl oxetane;
2-allyloxymethyl-3-chloromethyl-3-ethyl oxetane;
2-phenoxymethyl-3-fluoro-3-methyl oxetane, and the like;
2-methyl-3-methyl-4-methyl oxetane;
2-ethyl-3-chloromethyl-4-ethyl oxetane;
2-chloromethyl-3-vinyl-4-chloromethyl oxetane;
2-methoxy-3-bromo-4-methyl oxetane;
2-allyl-3-methoxy-4-methyl oxetane, and the like;
2-methyl-4-methyl oxetane;
2-vinyl-4-chloroethyl oxetane;
2-chloro-4-allyl oxetane;
2-methoxy-4-ethyl oxetane;
2-chloromethyl-4-chloromethyl oxetane;
2-chloromethyl-4-methoxymethyl oxetane, and the like.

This invention also contemplates new polyether copolymers derived from mixtures of oxetane monomers and oxirane monomers, and any monomeric oxirane having the following generalized structural formula:

in which the radicals, R and R′ may be the same or different, are each a hydrogen atom or a radical which is inert, i.e., non-reactive with the polymerization catalyst, is suitable for preparation of these new polyether copolymers.

The nature of the inert radicals, R and R′, can be varied widely, and include, in addition to hydrogen, hydrocarbon radicals, halogenated hydrocarbon radicals, as well as the oxa-analogous of these hydrocarbon and halogenated hydrocarbon radicals. Thus, these radicals may be acylic, cyclic, and mixed acyclic/cyclic radicals, such as aliphatic, cycloaliphatic, aromatic, and mixed aliphatic/aromatic radicals, which may contain, in addition to carbon and hydrogen, organically bonded halogen and oxygen atoms. The aliphatic and cycloaliphatic hydrocarbon portions of these radicals may be saturated or unsaturated acyclic or cyclic structures as exemplified by alkyl, cycloalkyl, mixed alkylcycloalkyl, and the corresponding radicals having non-aromatic carbon-to-carbon unsaturation as exemplified by alkenyl, cycloalkenyl, alkenylcycloalkyl, alkylcycloalkenyl, etc. In order that these radicals, R and R′, shall be inert, i.e., non-reactive with the polymerization catalysts employed, they should not contain any groups which have Zerewitinoff hydrogen atoms, such as amino groups, hydroxyl groups, carboxylic acid groups, etc.

By way of example, but not in limitation of the invention, therefore, suitable R and R′ substituents include, in addition to hydrogen, alkyl, cycloalkyl, aryl and aralkyl groups such as methyl, ethyl, propyl, butyl, cyclohexyl, phenyl, benzyl, xylyl, and the like; alkoxy, cycloalkoxy, aryloxy, aralkoxy groups, etc., such as methoxy, ethoxy, cyclohexyloxy, phenoxy, benzyloxy, and the like; alkoxymethyl, cycloalkoxymethyl, aryloxymethyl, aralkyloxymethyl groups, etc., such as methoxymethyl, ethoxymethyl, cyclohexyloxymethyl, phenoxymethyl, benzyloxymethyl groups, and the like; haloalkyl groups such as chloromethyl, bromoethyl, iodomethyl, fluoromethyl, chloromethyl, bromoethyl, iodomethyl, fluoromethyl, groups such as chloroethoxymethyl, bromoethoxymethyl, fluoropropoxymethyl, iodobutoxymethyl, and the like; ethylenically unsaturated alkenyl and alkenyloxymethyl groups such as vinyl, propenyl, isopropenyl, allyl, methallyl, butenyl, allyloxymethyl, propenyloxymethyl, methallyloxymethyl, oleyl, and the like; cycloaliphatic or aryl groups containing an ethylenically unsaturated group and cycloaliphatic radicals containing an ethylenic double bond in the ring, as for example, 4-vinylbenzyl, α-terpinyl, γ-terpinyl, abietyl, cyclohexenylmethyl, o-allylphenyl, o-allylphenoxymethyl, p-vinylbenzyl, and the like; or R and R′ together with the two carbons of the oxirane group may form a cycloaliphatic ring, i.e.,

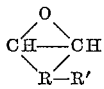

which may itself contain an ethylenic double bond or which may be substituted by an ethylenically unsaturated hydrocarbon group such as a vinyl group.

Thus, it is seen that suitable R and R′ radicals include, without limitation, all groups which are substantially non-reactive with the catalysts employed in this invention. Typical of these monomeric oxiranes which can be copolymerized with monomeric oxetanes to form the new high molecular weight polyether copolymers of this invention, but not in limitation of the invention, are such compounds as the alkylene oxides as, for example, ethylene oxide; propylene oxide; butene-1 oxide; cis and trans butene-2 oxides; hexene-1 oxide; hexene-2 oxide; dodecene-1 oxide; hexadecene-1 oxide; octadecene-1-oxide; iosbutylene epoxide; and the like; halogen substituted alkylene oxides such as epihalohydrins as, for example, epichlorohydrin; epibromohydrin; epifluorohydrin; epiiodohydrin; trifluoromethyl ethylene oxide; perfluoropropylene oxide; perfluoroethylene oxide; dichloroisobutylene epoxide; 1,1-dichloro-3,4-epoxybutane; 1-chloro-3,4-epoxybutane; 3-chloro-1,2-epoxybutane; 1-chloro-4,5-epoxypentane; 1,1-dichloro-2,3-epoxypropane; 1,1,1-trichloro-2,3-epoxypropane; 1,1,1-trichloro-3,4-epoxybutane; and the like; cycloaliphatic epoxides such as cyclohexene oxides; α-pinene epoxide; dipentene epoxide; styrene oxide; α-methyl styrene oxide; and the like; saturated epoxy ethers such as alkyl glycidyl ethers, as, for example, methyl glycidyl ether; ethyl glycidyl ether; isopropyl glycidyl ether; isobutyl glycidyl ether; tert-butyl glycidyl ether; n-hexyl glycidyl ether; n-octyl glycidyl ether; and the like; cycloalkyl- and alkylcycloalkyl glycidyl ethers, as, for example, cyclohexyl glycidyl ether; methyl cyclohexyl glycidyl ether; aryl- and aralkyl glycidyl ethers, as, for example, phenyl glycidyl ether; benzyl glycidyl ether; xylyl glycidyl ether; haloalkyl-, halocycloalkyl-, haloaryl glycidyl ethers, as, for example, chloroethyl glycidyl ether; bromoethyl glycidyl ether; 2-chloro-1-methylethyl glycidyl ether; chlorocyclohexyl glycidyl ether; chlorophenyl glycidyl ether; and the like; alkyloxy-, cycloalkyloxy-, aryloxy, aralkoxy glycidyl ethers, as, for example, ethoxy glycidyl ether; cyclohexyloxy glycidyl ether; methylcyclohexyloxy glycidyl ether; phenoxy gylcidyl ether; benzyloxy glycidyl ether; and the like; alkoxymethyl-, cycloalkyloxymethyl-, aryloxymethyl-, aralkoxymethyl glycidyl ethers, as, for example, methoxymethyl glycidyl ether; ethoxymethyl glycidyl ether; cyclohexyloxymethyl glycidyl ether; methylcyclohexyloxymethyl glycidyl ether; phenoxymethyl glycidyl ether; benzyloxymethyl glycidyl ether; and the like; other saturated epoxy ethers as, for example, 2-methyl,3-methyloxyethyl oxirane; 2-benzyl,3-methyloxypropyl oxirane; 2-ethyl,3-ethyloxyethyl oxirane; 2-cyclohexyl, 3-methyloxyethyl oxirane; 2-chloromethyl,3-benzyloxymethyl oxirane; 2,3-bis(methyloxyethyl)oxirane; and the like.

Typical monomeric oxiranes having at least one ethylenic unsaturated group therein which can be copolymerized with monomeric oxetanes in accordance with this invention are represented by the above general structural formula:

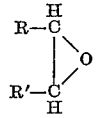

in which R is an ethylenically unsaturated radical, as, for example, ethylenically unsaturated aliphatic radicals such as vinyl, propenyl, isopropenyl, allyl, methallyl, butenyl, hexenyl, oleyl, etc., and cycloaliphatic or aryl radicals containing an ethylenically unsaturated substituent and cycloaliphatic radicals containing an ethylenic double bond in the ring, as, for example, 4-vinylcyclohexyl, α-terpinyl, γ-terpinyl, abietyl, cyclohexenylmethyl, o-allylphenyl, o-allyphenoxy, p-vinylbenzyl, etc., and R′ is hydrogen, R (as defined above), alkyl, cycloalkyl, aryl, or aralkyl, or R and R′ together with the two carbons of the oxirane ring may form a cycloaliphatic ring, i.e.,

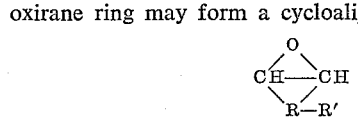

which may itself contain an ethylene double bond or which may be substituted by an ethylenically unsaturated hydrocarbon group such as a vinyl group. Exemplary of these oxiranes having ethylenically unsaturated groups therein are butadiene monoxide; chloroprene monoxide; 3,4-epoxy-1-pentene; 4,5-epoxy-2-pentene; 4,5-epoxy-1-hexene; 5,6-epoxy-1-hexene; 5,6-epoxy-2-hexene; 3,4-epoxy-1-vinylcyclohexene; divinylbenzene monoxide; 1,2-epoxy-5,9-cyclododecadiene; 5,6-epoxy-1,7-octadiene; and the like; ethylenically unsaturated ethers of the general formula:

in which R′ is —(CR₂″)ₙ—O—R‴; n is an integer from 1 to 4; R is hydrogen; alkyl, or —(CR₂″)ₙ—O—R‴; R″ is hyrogen or alkyl; and R‴ is an ethylenically unsaturated radical, as, for example, ethylenically unsaturated aliphatic radicals such as vinyl, propenyl, isopropenyl, allyl, methallyl, butenyl, oleyl, etc., and cycloalkyl or aryl radicals containing an ethylenically unsaturated substituent and cycloalkyl radicals containing an ethylenic double bond in the ring, as, for example, 4-vinylcyclohexyl, α-terpinyl, γ-terpinyl, abietyl, cyclohexenylmethyl, o-allyphenyl, p-vinylbenzyl, etc. Preferably the ethylene double bond will be at least β to the ether oxygen. Exemplary of these ethers are vinyl glycidyl ether; allyl glycidyl ether; methallyl glycidyl ether; vinylcyclohexyl glycidyl ether; o-allyphenyl glycidyl ether; p-vinylbenzyl glycidyl ether; the allyl ether of 2,3-epoxybutan-1-ol; the allyl ether of 2,3-epoxy-hexan-1-ol; the diallyl ether of 2,3-epoxy-butan-1,4-diol; and the like.

Other suitable oxiranes having ethylenically unsaturated groups therein are the ethylenically unsaturated glycidyl esters of the general formula:

in which R is hydrogen, R′ is

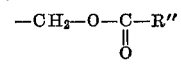

and R″ is an ethylenically unsaturated radical such as vinyl, propenyl, isopropenyl, allyl, methallyl, butenyl, 4-vinylcyclohexyl, α-terpinyl, cyclohexenyl, o, m and p-allylphenyl, o, m and p-crotylphenyl, p-vinylbenzyl, etc. Exemplary of such glycidyl esters are glycidyl methacrylate, glycidyl crotonate, glycidyl oleate, glycidyl linoleate, glycidyl abietate, etc.

In order for the new polyether copolymers of this invention to be elastomeric rubbery products, a major amount of repeating units thereof must be derived from monomeric oxetanes, monomeric oxiranes, or mixtures thereof, which inherently contribute rubber-like properties to the copolymer molecules. Such flexibilizing repeating units may be derived entirely from monomeric oxetanes and/or monomeric oxiranes having only substituent groups which are inert to sulfur vulcanization, or from mixtures of oxetane and/or oxirane monomers having only substituent groups which are inert to sulfur vulcanization with ethylenically unsaturated oxetane and/or oxirane monomers.

Flexibilizing oxetanes which can contribute rubber-like properties to the new copolymers of this invention are described by the general formula:

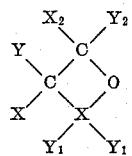

in which at least 4 of the X, $X_1$, $X_2$, Y, $Y_1$, and $Y_2$ substituents are hydrogen, and not more than 2 of the X, $X_1$, $X_2$, Y, $Y_1$, and $Y_2$ substituents are selected from the group consisting of alkyl, alkenyl, alkoxymethyl, alkenyloxymethyl, haloalkyl, and haloalkyloxymethyl radicals. A particularly preferred species of the flexibilizing type of oxethane monomer is trimethylene oxide,

Other preferred flexibilizing oxethanes include 2-alkyloxetanes, 2-haloalkyloxetanes, 3-haloalkyloxetanes, and 3,3-dialkyloxetanes. Some typical and preferred ethylenically unsaturated flexibilizing oxetanes include 3-allyl-oxymethyl - 3 - methyl oxetane; 3-propenyl-oxymethyl-3-methyl oxetane; 3,3-bis-allyloxymethyl)oxetane; 3,3-bis-(propenyloxymethyl)oxetane; 2-allyloxymethyl-3-allyl-oxymethyl oxetane; 2-allyloxetane; 3-allyloxetane; 2-vinyl oxetane; 3-vinyl oxetane; etc.

At least about 50% of the repeating units should be derived from the above preferred flexibilizing type oxetanes, except when flexibilizing oxiranes such as alkylene oxides, epihalohydrins, or mixtures thereof with butadiene monoxide, allyl glycidyl ether, etc., are major components, and then at least 5% and preferably at least about 20% to about 30% of the repeating units should be derived from the above preferred flexibilizing type oxetanes. Minor amounts, i.e., less than 50% and preferably less than 30% of the repeating units may be derived from other oxetanes, as hereinbefore described.

Flexibilizing oxiranes which can contribute rubber-like properties to the new copolymers of this invention are described by the general formula

in which R and R' is each selected from the group consisting of hydrogen, alkyl, alkenyl, alkoxymethyl, alkenyloxymethyl, haloalkyl, and haloalkyloxymethyl radicals, some typical examples being ethylene oxide, propylene oxide, butene-1 oxide, cis and trans butene-2 oxides, hexene-1 oxide, hexene-2 oxide, and epihalohydrins. Some typical and preferred ethylenically unsaturated flexibilizing oxiranes include butadiene monoxide, piperylene monoxide, and the unsaturated glycidyl ethers as, for example, vinyl glycidyl ether, allyl glycidyl ether, o-allphenyl glycidyl ether, methallyl glycidyl ether, etc.

Up to 95%, preferably up to about 70%, of the repeating units of the copolymers of this invention may be derived from such flexibilizing oxiranes. Minor amounts, i.e., less than 50% and preferably less than 30% of the repeating units may be derived from other oxiranes, as hereinbefore described. For general purpose use, ethylene oxide should be limited to that amount which does not contribute excessive water sensitivity. Usually this will be less than about 10%, preferably less than about 5% by weight. On the other hand, for uses where a water-soluble elastometer is desired, then large amounts of ethylene oxide, on the order of 50% by weight or even more, are necessary.

The new copolymers of this invention are generally elastomeric products capable of sulfur-vulcanization with conventional sulfur systems to yield outstanding vulcanizates. In the unvulcanized state, they are generally tough snappy rubbers having molecular weights of at least about 50,000, and having reduced specific viscosity, $\eta_{sp/c}$, of at least about 1, preferably at least about 2 to about 3, as measured on a 0.1% by weight solution of the polymer in chloroform at 25° C.

Although largely amorphous polymers are preferred for best rubbery characteristics, some degree of crystallinity in the polymer is somewhat advantageous in some instances. The amount of crystallinity should not exceed that amount which interferes materially with the rubbery properties, and will usually be below about 25% and preferably below about 15%, as determined by X-ray diffraction analysis. However, this does not preclude relatively high crystallinity in the vulcanized copolymer, since crystallinity in the vulcanized copolymer is the really important criterion. Thus, it is entirely feasible for a highly crystalline copolymer at normal temperature unvulcanized to have low crystallinity when vulcanized, particularly if plasticized, or to be used vulcanized at a temperature above the crystalline melting point of the unvulcanized copolymer, and thus be amorphous under use conditions. Higher crystallinities, of course, may appear on stretching, and is desirable in many cases.

Most of the new copolymers of this invention are insoluble in water, exceptions being copolymers high in ethylene oxide content, but are soluble in at least some organic solvents, particularly chloroform, methylene chloride, acetone, cyclohexanone, benzene and toluene. Some of these new copolymers having a high proportion of repeating units derived from 3-3-dimethyloxetane are soluble in aliphatic hydrocarbons. The copolymers containing mainly repeating units derived from trimethylene oxide are unusual in that they are insoluble in n-heptane and in methanol, and they are also superior elastomers, since all of the atoms are part of the main polymer chain (no branch chains) and thus offer the ultimate in chain flexibility of all known water-insoluble elastomers. Copolymers containing substantial amounts of haloalkyl groups have even more greatly enhanced solvent resistance, coupled with good low temperature strength and flexibility behavior and improved hysteresis.

In general these new copolymers are readily processed on conventional rubber equipment and are readily vulcanized with conventional sulfur recipes to produce excellent rubbers which have outstanding properties, particularly in overall mechanical properties, low temperature properties, hysteresis, aging and ozone resistance. Such vulcanized products are useful in the many areas of utility for vulcanized rubbers, as for example, tires, hose, gasketing, mechanical goods, etc. These new copolymers are advantageously extended with various hydrocarbon oils especially of the aromatic type, or plasticizers and can be deinforced with a variety of carbon blacks, silicas, clays, mineral fillers, etc. Stabilizers such as conventional antioxidants and antiozonants are also advantageously added to the copolymers to further improve storage and use stability. The specific materials utilized and their method of incorporation will, of course, depend on the intermediate and the finished products desired, and, in general, additive incorporation may take place with the comonomers as well as the end product copolymers.

The general nature of the invention having been set forth, the following examples illustrate some specific embodiments of the invention. It is to be understood, however, that the invention is in no way limited to the examples, since this invention contemplates the incorporation of various modifications and changes within the scope of the invention as herein set forth and described. All parts in the following examples are by weight, unless otherwise designated.

*Example 1*

A polymerization vessel in which air had been replaced with nitrogen was charged with 92 parts of n-heptane, 14.5 parts of trimethylene oxide

and 0.15 part of allyl glycidyl ether dissolved in 0.9 part n-heptane, and the vessel and contents were raised to 65° C. Then, while at 65° C., the supernatant from the chelated reaction product of 1 mole triethylaluminum-1 mole acetylacetone-0.5 mole water in n-heptane and diethyl ether made from 1.37 parts of triethylaluminum was added as catalyst and the reaction mixture was agitated for 7.5 hours at 65° C., then stored at room temperature for 16 hours, and again agitated for 2 more hours at 65° C., making a total reaction time of 25.5 hours. During this time additional quantities of allyl glycidyl ether were added at 2, 4, 6, 7.5 and 23.5 hours, each quantity amounting to 0.09 part of allyl glycidyl ether dissolved in 0.5 part of n-heptane.

The catalyst for this example was prepared by adding 2.65 parts of diethyl ether to a solution of 1.37 parts of triethylaluminum dissolved in 5.85 parts of n-heptane. Then, at 0° C., 1.19 parts of acetylacetone was added over a period of 15 minutes while stirring. The mixture was stirred for an additional hour at 0° C., whereupon 0.107 part of water was added over a period of 15 minutes. The mixture was stirred for an additional 15 minutes at 0° C., and then for 2 hours at room temperature. The catalyst was stored at room temperature before use.

The polymerization was stopped by adding 6 parts of anhydrous ethanol, and the reaction mixture was then diluted with diethyl ether, the insoluble copolymer was collected and washed once with diethyl ether. It was then dissolved in an 80/20 mixture of diethyl ether/methanol containing 0.5% HCl. The copolymer was recovered therefrom by precipitating with 5 volumes of methanol, collecting the precipitated copolymer, washing neutral with methanol and then once with methanol containing 0.05% of 4,4'-thiobis(6-tert-butyl-m-cresol), and then drying the copolymer for 16 hours in vacuo at 80° C.

The resulting dried copolymer, obtained in 43% yield based on the mixture of oxetane and allyl glycidyl ether monomers, was a very tough, snappy rubber having a reduced specific viscosity, $\eta_{sp/c}$, of 38.4 as determined on a 0.1% solution of the copolymer in chloroform at 25° C. Bromine number analysis indicated the copolymer to contain approximately 4.3% allyl glycidyl ether repeating units.

A sample of the above copolymer was cured for 45 minutes at 310° F. in the following vulcanization formula:

| Ingredient: | Parts |
| --- | --- |
| Copolymer | 100 |
| Zinc oxide | 5 |
| Stearic acid | 1 |
| 2-mercaptobenzothiazole disulfide | 1 |
| Tetramethylthiuram disulfide | 2 |

The vulcanized specimen gave 91% gel and 1,140% swell in toluene (4 hours at 80° C.), thus demonstrating conclusively preparation of a uniform copolymer.

*Example 2*

A polymerization vessel in which air had been replaced with nitrogen was charged with 187 parts of n-heptane, 15 parts of trimethylene oxide,

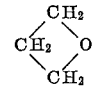

2.7 parts of 2,3-epoxy propane,

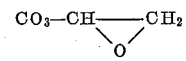

and 0.3 part allyl glycidyl ether, and the vessel and contents were adjusted to 65° C. Then, at 65° C., a chelated reaction product made from 1 mole triethylaluminum-0.5 mole water-1.0 mole acetylacetone dissolved in n-heptane and diethyl ether and equivalent to 1.82 parts of triethylaluminum was added as catalyst, and the reaction mixture was agitated for 7.5 hours at 65° C., and then stored 16 hours at 30° C., making a total reaction time of 23.5 hours. During this time additional quantities of propylene oxide and of allyl glycidyl ether were added at 2, 4, 6 and 7.5 hours, each quantity of propylene oxide being 2.7 parts, and each quantity of allyl glycidyl ether being 0.3 part.

The catalyst for this example was prepared by adding 14.4 parts of diethyl ether to a solution of 1.82 parts of triethylaluminum dissolved in 6.4 parts of n-heptane. Then, at 0° C., 0.144 part of water was added over a period of 30 minutes at 0° C., whereupon 1.6 parts of acetylacetone was added over a period of 30 minutes with stirring, and the mixture was stirred for an additional hour at 0° C. The mixture was then stirred for an additional 2 hours at room temperature. The catalyst was stored at room temperature before use.

The polymerization was stopped by adding 12 parts of anhydrous ethanol. The reaction mixture was then diluted with sufficient diethyl ether to make the solution of low viscosity for ease in handling, and was washed once with water containing 3% of hydrogen chloride for 1 hour with agitation, and then several times with water. A heptane-insoluble terpolymer was then precipitated from the reaction mixture by adding thereto a large excess of n-heptane, between about 5 and 10 volumes of n-heptane per volume of reaction mixture. The heptane-insoluble terpolymer was collected, washed twice with n-heptane, then with water until neutral, and finally the terpolymer was washed once with n-heptane containing 0.2% of 4,4'-thiobis(6-tert-butyl-m-cresol) and dried 16 hours at 80° C. in vacuum.

The resulting dry terpolymer, obtained in 28% yield, based on the mixture of monomers employed, was a tough snappy rubber having a reduced specific viscosity, $\eta_{sp/c}$, of 6.9 as determined on a 0.1% solution of the terpolymer in chloroform at 25° C. Bromine number analysis indicated the terpolymer to contain approximately 10° allyl glycidyl ether repeating units, and the heptane insolubility of this product was good evidence that it was a terpolymer. This terpolymer was amorphous by X-ray analysis.

The heptane-diluted reaction mixture, after separation from the heptane-insoluble terpolymer, was combined with the heptane washes from the work-up of the above heptane-insoluble terpolymer, omitting the heptane wash containing 4,4'-thiobis(6-tert-butyl-m-cresol), and the resultant mixture was concentrated by evaporation to a smaller volume for convenience in the work-up. The resulting concentrated mixture was washed first with water containing 3% of hydrogen chloride for 1 hour with stirring, then with water until neutral, then with water containing 2% of sodium bicarbonate, and again with water until neutral. An amount of 4,4′-thiobis(6-tert-butyl-m-cresol) equal to 0.5% based on the polymer was added in methanol solution to the washed mixture, after which a heptane-soluble terpolymer was recovered by evaporating the mixture to dryness. The isolated heptane-soluble terpolymer, obtained in 20% yield, based on the mixture of monomers employed, was a tacky rubber which was amorphous by X-ray analysis, having a reduced specific viscosity of 5.1 as measured on a 0.1% solution of the terpolymer in chloroform at 25° C. Bromine number analysis indicated this heptane-soluble terpolymer to contain approximately 9.3% of allyl glycidyl ether repeating units.

Samples of the heptane-insoluble terpolymer and of the heptane-soluble terpolymer were cured for 40 minutes at 310° F. in the following vulcanization formulas:

| Ingredient | Parts | |
|---|---|---|
| Heptane-insoluble terpolymer | 100 | |
| Heptane-soluble terpolymer | | 100 |
| High abrasion furnace black | 50 | 50 |
| Zinc Oxide | 5 | 5 |
| Stearic Acid | 2 | 2 |
| 2-Mercaptobenzothiazole disulfide | 1 | 1 |
| Tetramethylthiuram disulfide | 2 | 2 |
| Sulfur | 2 | 2 |

The following physical properties were obtained on the vulcanized specimens:

| | Heptane-Insoluble Terpolymer | Heptane-Soluble Terpolymer |
|---|---|---|
| Tensile Strength, pounds per sq. in | 2,030 | 2,030 |
| Modulus (200%) pounds per sq. in | 1,730 | 2,020 |
| Ultimate Elongation, Percent | 225 | 200 |
| Hardness (Shore A2) | 75 | 78 |
| Break Set | 0 | 0 |

*Example 3*

A polymerization vessel in which air had been replaced with nitrogen was charged with 111 parts of n-heptane, 19.4 parts of trimethylene oxide,

and 0.2 part of allyl glycidyl ether dissolved in 1.2 parts of n-heptane, and the vessel and contents were adjusted to 65° C. Then, while at 65° C., a chelated reaction product made from 1 mole triethylaluminum-0.5 mole water-1 mole acetylacetone dissolved in n-heptane and diethyl ether and equivalent to 1.82 parts triethylaluminum was added as catalyst, and the polymerization reaction mixture was agitated for 7.5 hours at 65° C., then stored at room temperature for 16 hours, and again agitated for 2 more hours at 65° C., making a total of 25.5 hours reaction time. During this time additional quantities of allyl glycidyl ether were added at 2, 4, 6, 7.5 and 23.5 hours, each quantity of allyl glycidyl ether being 0.12 part dissolved in 0.75 part of n-heptane.

The catalyst was the same as described in Example 2.

The polymerization was stopped by adding 8 parts of anhydrous ethanol, and insoluble copolymer was collected, washed twice with n-heptane, washed once with methanol containing 0.5% of hydrogen chloride, washed neutral with methanol, washed once with methanol containing 0.1% of 4,4′-thiobis(6-tert-butyl-m-cresol), and the washed copolymer was dried 16 hours at 80° C. in vacuum.

The resulting dried copolymer, obtained in 65% yield, based on mixture of monomers employed, was a very tough snappy rubber having a reduced specific viscosity, $\eta_{sp/c}$, of 37.8 as determined on a 0.1% solution of the copolymer in chloroform at 25° C. The copolymer was amorphous by X-ray analysis, and contained approximately 3.6% of allyl glycidyl ether repeating units based on bromine number analysis.

A portion of the copolymer was compounded in the following formula:

| Ingredient: | Parts |
|---|---|
| Copolymer | 100 |
| High abrasion furnace black | 50 |
| Zinc oxide | 5 |
| Stearic acid | 2 |
| 2-mercaptobenzothiazole disulfide | 1 |
| Tetramethylthiuram disulfide | 2 |
| Sulfur | 2 |

A specimen of the above formula compression molded 40 minutes at 310° F. gave the following excellent physical properties:

| | |
|---|---|
| Tensile strength, pounds per sq. in. | 3320 |
| 300% modulus, pound per sq. in. | 2490 |
| Elongation at break, percent | 425 |
| Break set, percent | 10 |
| Shore A2 hardness | 85 |
| Tg (brittle temperature), ° C. | about —75 |

*Example 4*

A polymerization vessel in which air had been replaced with nitrogen was charged with 155 parts of n-heptane, 25.4 parts of trimethylene oxide,

and 0.49 part of butadiene monoxide dissolved in 1.13 parts of n-heptane, and the vessel and contents were adjusted to 65° C. Then, at 65° C., a chelated reaction product made from 1 mole triethylaluminum-0.5 mole water-1 mole acetylacetone dissolved in n-heptane and diethyl ether and equivalent to 2.5 parts of triethylaluminum was added as catalyst, and the reaction mixture was agitated for 7.5 hours at 65° C., then stored for 16 hours at room temperature, and again agitated for 4 more hours at 65° C., making a total of 27.5 hours' reaction time. During this time additional quantities of butadiene monoxide were added at 2, 4, 6, 7.5, 23.5 and 25.5 hours, the quantities added at 2, 4, 6 and 7.5 hours each being 0.40 part dissolved in 0.92 part of n-heptane, and the quantities added at 23.5 and 25.5 hours each being 0.27 part dissolved in 0.62 part of n-heptane.

The catalyst for this example was prepared by adding 19.6 parts of diethyl ether to a solution of 2.5 parts of triethylaluminum dissolved in 8.7 parts of n-heptane. Then, at 0° C., 0.196 part of water was added over a period of 30 minutes at 0° C., whereupon 2.17 parts of acetylacetone was added over a period of 30 minutes with stirring, and the mixture was stirred for an additional hour at 0° C. The mixture was then stirred for an additional 2 hours at room temperature. The catalyst was stored at room temperature before use.

The polymerization was stopped by adding 4 parts of anhydrous ethanol for each 10 parts of total monomers employed. The reaction mixture was then diluted with 4 volumes of n-heptane for each volume of reaction mixture, the insoluble copolymer was collected, washed once with n-heptane, washed once with methanol containing 0.5% of hydrogen chloride, washed with methanol until neutral, washed once with methanol containing 0.1% of 4,4′-thiobis(6-tert-butyl-m-cresol), and the washed copolymer was dried 16 hours at 80° C. in vacuum.

The resulting dried copolymer, obtained in 89% yield, based on mixture of monomers employed, was a tough snappy rubber having a reduced specific viscosity, $\eta_{sp/c}$, of 28.3 as determined on a 0.1% solution of the copolymer in chloroform at 25° C. The copolymer contained approximately 5.5% of repeating units derived from butadiene monoxide based on Bromine Number analysis.

Portions of the copolymer were compounded in the following formulas:

| Ingredients | Parts | |
|---|---|---|
| | Formula 1 | Formula 2 |
| Copolymer | 100 | 100 |
| High abrasion furnace black | 50 | |
| Zinc Oxide | 5 | 5 |
| Stearic Acid | 1 | 1 |
| Mercaptobenzothiazole disulfide | 1 | 1 |
| Tetramethylthiuram disulfide | 2 | 2 |
| Sulfur | 2 | 2 |

A specimen of the above Formula 1 compression molded 40 minutes at 310° F. gave the following physical properties:

Tensile strength, pounds per sq. in. _____ 2090
300% modulus, pounds per sq. in. _____ 1155
Elongation at break, percent _____ 535
Break set, percent _____ 70
Shore A2 hardness _____ 71

A specimen of the above Formula 2 compression molded 40 minutes at 310° F. gave 94% gel and 625% swell when immersed for 4 hours in toluene at 80° C.

*Example 5*

A polymerization vessel in which air had been replaced with nitrogen gas was charged with 154 parts of n-heptane, 25.4 parts of trimethylene oxide,

and 0.13 part of allyl glycidyl ether dissolved in 1.44 parts of n-heptane, and the vessel and contents were adjusted to 65° C. Then, at 65° C., a chelated reaction product made from 1 mole triethylaluminum-0.5 mole water-1 mole acetylacetone dissolved in n-heptane and diethyl ether and equivalent to 2.5 parts of triethylaluminum was added as catalyst, and the reaction mixture was agitated for 7.5 hours at 65° C., then stored for 16 hours at room temperature, and again agitated for 4 more hours at 65° C., making a total of 27.5 hours reaction time. During this time additional quantities of allyl glycidyl ether were added at 2, 4, 6, 7.5, 23.5 and 25.5 hours, the quantities added at 2, 4, 6 and 7.5 hours each being 0.105 part dissolved in 1.17 parts of n-heptane, and the quantities added at 23.5 and 25.5 hours each being 0.07 part dissolved in 0.78 part of n-heptane.

The catalyst for this example was the same as described in Example 4.

The polymerization was stopped, and the polymerization reaction mixture was worked up as described in Example 4.

The resulting dried copolymer, obtained in 94% yield, based on the mixture of monomers employed, was a tough snappy rubber having a reduced specific viscosity, $\eta_{sp/c}$, of 42.5 as determined on a 0.1% solution of the copolymer in chloroform at 25° C. The copolymer contained approximately 1.6% of repeating units derived from allyl glycidyl ether based on Bromine Number analysis.

Portions of the copolymer were compounded in the two vulcanization formulas described in Example 4.

A specimen of the copolymer compounded in vulcanization Formula 1, compression molded 40 minutes at 310° F. gave the following physical properties:

Tensile strength, pounds per sq. in. _____ 3010
300% modulus, pounds per sq. in. _____ 1035
Elongation at break, percent _____ 770
Break set, percent _____ 80
Shore A2 hardness _____ 72

A specimen of the copolymer compounded in vulcanization Formula 2, compression molded 40 minutes at 310° F., gave 93% gel and 820% swell when immered for 4 hours in toluene at 80° C.

*Example 6*

A polymerization vessel in which air had been replaced with nitrogen gas was charged with 41.7 parts toluene and 5 parts of a mixture of monomers consisting of 97% of trimethylene oxide and 3% of 3,3-bis(allyloxymethyl)oxetane, and the vessel and contents were adjusted to 30° C. Then, at 30° C., a chelated reaction product made from 1 mole triethylaluminum-0.5 mole water-0.04 mole acetylacetone dissolved in n-heptane and diethyl ether and equivalent to 0.23 part of triethylaluminum was added as catalyst, and the reaction mixture was agitated for 19 hours at 30° C.

The catalyst for this example was prepared by adding 0.46 part of diethyl ether to a solution of 0.23 part of triethylaluminum dissolved in 0.8 part of n-heptane. Then, at 0° C., 0.018 part of water was added over a period of 30 minutes at 0° C., whereupon 0.008 part of acetylacetone was added over a period of 30 minutes with stirring, and the mixture was stirred for an additional hour at 0° C. The mixture was then stirred for an additional 2 hours at room temperature. The catalyst was stored at room temperature before use.

The polymerization was stopped, and the polymerization reaction mixture was worked up as described in Example 4.

The resulting dried copolymer, obtained in 40% yield, based on the mixture of monomers employed, was a tough snappy rubber having a reduced specific viscosity, $\eta_{sp/c}$, of 9.5 as determined on a 0.1% solution of the copolymer in chloroform at 25° C. The copolymer contained approximately 3.6% of repeating units derived from 3,3-bis(allyloxymethyl)oxetane based on bromine number analysis.

A portion of the copolymer compounded in vulcanization Formula 2 described in Example 4, when compression molded for 40 minutes at 310° F., gave 55% gel and 605% swell when immersed for 4 hours in toluene at 80° C.

*Example 7*

A polymerization vessel in which air had been replaced with nitrogen gas was charged with 166 parts of toluene and 20 parts of a mixture of monomers consisting of 97% trimethylene oxide and 3% of 3,3-bis(allyloxymethyl)oxetane, and the reaction vessel and contents were adjusted to 30° C. Then, at 30° C., a chelated reaction product made from 1 mole triethylaluminum-0.5 mole water-0.04 mole acetylacetone dissolved in n-heptane and diethyl ether and equivalent to 0.92 part of triethylaluminum was added as catalyst, and the reaction mixture was agitated for 2 hours at 30° C.

The catalyst for this example was prepared by adding 1.8 parts of diethyl ether to a solution of 0.92 part of triethylaluminum dissolved in 3.2 parts of n-heptane. Then, at 0° C., 0.072 part of water was added over a period of 30 minutes at 0° C., whereupon 0.032 part of acetylacetone was added over a period of 30 minutes with stirring, and the mixture was stirred for an additional hour at 0° C. The mixture was then stirred for an additional 2 hours at room temperature. The catalyst was stored at room temperature before use.

The polymerization was stopped, and the polymerization reaction mixture was worked up as described in Example 4.

The resulting dried copolymer, obtained in 7.9% yield, based on the mixture of monomers employed, was a tough, snappy rubber having a reduced specific viscosity, $\eta_{sp/c}$, of 3.9 as determined on a 0.1% solution of the copolymer in chloroform at 25° C. The copolymer contained approximately 3.2% of repeating units derived from 3,3-bis(allyloxymethyl)oxetane based on bromine number analysis.

A portion of the copolymer compounded in vulcanization Formula 2 described in Example 4, when compression molded for 40 minutes at 310° F., gave 90% gel and 505% swell when immersed in toluene for 4 hours at 80° C.

Example 8

A polymerization vessel in which air had been replaced with nitrogen gas was charged with 166 parts of toluene and 20 parts of a mixture of monomers consisting of 95% of trimethylene oxide and 5% of 3,3-bis(allyloxymethyl)oxetane, and the vessel and contents were adjusted to 30° C. Then, at 30° C., a chelated reaction product made from 1 mole triethylaluminum-0.5 mole water-0.04 mole acetylacetone dissolved in n-heptane and diethyl ether and equivalent to 0.92 part of triethylaluminum was added as catalyst, and the reaction mixture was agitated for 2 hours at 30° C.

The catalyst for this example was the same as described in Example 7.

The polymerization was stopped, and the polymerization reaction mixture was worked up as described in Example 4.

The resulting dried copolymer, obtained in 25% yield, based on the mixture of monomers employed, was a somewhat tacky rubber having a reduced specific viscosity, $\eta_{sp/c}$, of 3.1 as determined on a 0.1% solution of the copolymer in chloroform at 25° C. The copolymer contained approximately 6.7% of repeating units derived from 3,3-bis(allyloxymethyl)oxetane based on bromine number analysis.

Portions of the copolymer were compounded in the two vulcanization formulas described in Example 4.

A specimen of the copolymer compounded in vulcanization Formula 1, compression molded for 40 minutes at 310° F., gave the following physical properties:

| | |
|---|---|
| Tensile strength, pounds per sq. in. | 3280 |
| 300% modulus, pounds per sq. in. | 3250 |
| Elongation at break, percent | 305 |
| Break set, percent | 10 |
| Shore A2 hardness | 78 |

A specimen of the copolymer compounded in vulcanization Formula 2, compression molded for 40 minutes at 310° F., gave 101% gel and 270% swell when immersed for 4 hours in toluene at 80° C.

Example 9

A polymerization vessel in which air had been replaced with nitrogen gas was charged with 15.6 parts of n-heptane and 5 parts of a mixture of monomers consisting of 94% of 3,3-dimethyloxetane and 6% of 3,3-bis(allyloxymethyl)oxetane, and the vessel and contents were adjusted to 0° C. Then, at 0° C., a chelated reaction product made from 1 mole triethylaluminum-0.5 mole water-0.04 mole acetylacetone dissolved in n-heptane and diethyl ether and equivalent to 0.23 part of triethylaluminum was added as catalyst, and the reaction mixture was agitated for 5 minutes at 0° C.

The catalyst for this example was the same as described in Example 6.

The polymerization was stopped as described in Example 4.

The reaction mixture was then diluted with sufficient diethyl ether to make the solution of low viscosity for ease in handling, and was washed twice by agitating with water containing 3% of hydrogen chloride for 15 minutes for each wash, washed neutral with water, washed once with water containing 2% of sodium bicarbonate, and then washed 3 times with water. An amount of 4,4'-thiobis(6-tert-butyl-m-cresol) equal to 0.5% based on the polymer present in the polymerization reaction mixture was added to the washed reaction mixture, and then solvent was stripped off under vacuum and the residual copolymer was dried 16 hours at 80° C. in vacuum.

The resulting dried copolymer, obtained in 90% yield, based on the mixture of monomers employed, was a tacky rubber which on standing at room temperature became a harder and tougher rubber. The reduced specific viscosity, $\eta_{sp/c}$, of the copolymer was 1.4 as determined on a 0.1% solution of the copolymer in chloroform at 25° C. The copolymer contained approximately 7% of repeating units derived from 3,3-bis(allyloxymethyl)oxetane based on bromine number analysis.

A portion of the copolymer compounded in vulcanization Formula 2 described in Example 4, when compression molded for 40 minutes at 310° F., gave 97% gel and 510% swell when immersed for 4 hours in toluene at 80° C.

Example 10

A polymerization vessel in which air had been replaced with nitrogen gas was charged with 94 parts of n-heptane and 30 parts of a mixture of monomers consisting of 90% of 3,3-dimethyl oxetane and 10% of 3,3-bis(allyloxymethyl)oxetane, and the vessel and contents were adjusted to 0° C. Then, at 0° C., a chelated reaction product made from 1 mole triethyl-aluminum-0.5 mole water-0.04 mole acetylacetone dissolved in n-heptane and diethyl ether and equivalent to 1.38 parts of triethylaluminum was added as catalyst, and the reaction mixture was agitated for 5 minutes at 0° C.

The catalyst for this example was prepared by adding 2.7 parts of diethyl ether to a solution of 1.38 parts of triethylaluminum dissolved in 4.8 parts of n-heptane. Then, at 0° C., 0.108 part of water was added over a period of 30 minutes at 0° C., whereupon 0.048 part of acetylacetone was added over a period of 30 minutes with stirring, and the mixture was stirred for an additional hour at 0° C. The mixture was then stirred for an additional 2 hours at room temperature. The catalyst was stored at room temperature before use.

The polymerization was stopped as described in Example 4, and the polymerization reaction mixture was worked up as described in Example 9.

The resulting dried copolymer, obtained in 92% yield, based on the mixture of monomers employed, was a tacky rubber of low crystallinity by X-ray analysis, which on standing at room temperature became a harder and tougher rubber. The reduced specific viscosity, $\eta_{sp/c}$, of the copolymer was 1.4 as determined on a 0.1% solution of the copolymer in chloroform at 25° C. The copolymer contained approximately 11.7% of repeating units derived from 3,3-bis(allyloxymethyl)oxetane based on bromine number analysis.

Portions of the copolymer were compounded in the two vulcanization formulas described in Example 4.

A specimen of the copolymer compounded in culcanization Formula 1, compression molded for 40 minutes at 310° F., gave the following physical properties.

| | |
|---|---|
| Tensile strength, pounds per sq. in. | 1985 |
| 200% modulus, pounds per sq. in. | 1810 |
| 100% modulus, pounds per sq. in. | 1395 |
| Elongation at break, percent | 210 |
| Break set, percent | 10 |
| Shore A2 hardness | 95 |
| Heat build up by ASTM-D623, ° F. | 14 |
| Tear strength, pounds per sq. in. (Graves Angle Tear ASTM-D624 (half size, die C)) | 275 |

After aging the above Formula 1 vulcanizate for 48 hours at 212° F. in an air oven, the following physical properties were obtained:

| | |
|---|---|
| Tensile strength, pounds per sq. in | 1820 |
| 100% modulus, pounds per sq. in. | 1360 |
| Elongation at break, percent | 170 |
| Break set, percent | 5 |
| Shore A2 hardness | 92 |

A specimen of the copolymer compounded in vulcanization Formula 2, compression molded for 40 minutes at 310° F., gave 99% gel and 390% swell when immersed in toluene for 4 hours at 80° C.

This application is a continuation-in-part of my U.S. application Serial No. 75,487, filed December 13, 1960.

What I claim and desire to protect by Letters Patent is:

1. An essentially linear, sulfur-vulcanizable polyether copolymer,
   (1) the repeating units of which are selected from the group consisting of (a)
   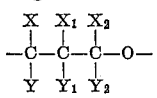

where 3 of the substituents X, X₁, X₂, Y, Y₁ and Y₂ are hydrogen, and the other 3 substituents are selected from the group consisting of hydrogen, halogen, alkyl, cycloalkyl, aryl, aralkyl, alkoxy, cycloalkoxy, aryloxy, aralkoxy, alkoxymethyl, cycloalkoxymethyl, aryloxymethyl, aralkoxymethyl, haloalkyl, haloalkoxymethyl, alkenyl, cycloalkenyl, alkenyloxymethyl, alkenylcycloalkyl, cycloalkenylalkyl, alkenylaryl and alkenylaralkyl; and (b)
   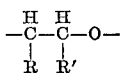

where R is selected from the group consisting of hydrogen, alkyl, cycloalkyl, aryl, aralkyl, alkoxymethyl, cycloalkoxymethyl, aryloxymethyl, aralkoxymethyl, haloalkyl, haloalkoxymethyl, halocycloalkoxymethyl, haloaryloxymethyl, alkoxymethoxymethyl, cycloalkoxymethoxymethyl, aryloxymethoxymethyl, aralkoxymethoxymethyl, alkenyl, haloalkenyl, alkenylcycloalkyl, alkenylaryl, cycloalkenyl, cycloalkenylalkyl, alkenylaralkyl; —(CR″)ₙ—O—R‴ where n is 1 to 4, R″ is selected from the group consisting of hydrogen and alkyl, and R‴ is selected from the group consisting of alkenyl, alkenylcycloalkyl, cycloalkenylalkyl, alkenylaryl, cycloalkenyl, cycloalkenylalkyl, and alkenylaralkyl;

—CH₂—O—C—R″″
         ‖
         O where R″″ is alkenyl, cycloalkenyl, cycloalkenylalkyl, alkenylcycloalkyl, alkenylaryl and alkenylaralkyl; and R′ is selected from the group consisting of hydrogen, alkyl, cycloalkyl, aryl, and aralkyl; and where R and R′ together with the carbons of the —CH—CH— group of the repeating unit form a group selected from a cycloalkenyl group and an alkenylcycloalkyl group;

(2) at least about 0.5% and not more than about 50% of said repeating units contain ethylenic unsaturation;

(3) at least 5% of the remainder of said repeating units being selected from the group consisting of

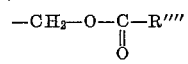

where 3 of the substituents Z₁, Z₂, Z₃, Z₄, Z₅ and Z₆ are hydrogen, and the other 3 substituents are selected from the group consisting of hydrogen, halogen, alkyl, cycloalkyl, aryl, aralkyl, alkoxy, cycloalkoxy, aryloxy, aralkoxy, alkoxymethyl, cycloalkoxymethyl, aryloxymethyl, aralkyloxymethyl, haloalkyl, and haloalkoxymethyl; and (4) said copolymer having a weight average molecular weight of at least about 50,000.

2. A sulfur-vulcanizable copolymer in accordance with claim 1 in which the repeating unit

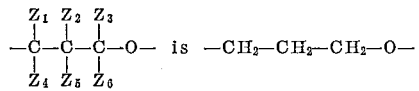

3. A sulfur-vulcanizable copolymer in accordance with claim 1 in which the repeating unit

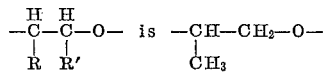

and the repeating unit

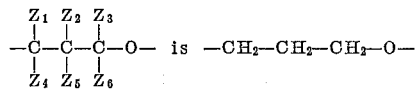

4. A sulfur-vulcanizable copolymer in which from 50 to 99.5% of the repeating units are

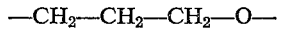

and from 0.5 to 50% of the repeating units are

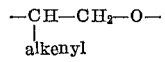

said copolymer having a weight average molecular weight of at least about 50,000.

5. A sulfur-vulcanizable copolymer in which from 50 to 99.5% of the repeating units are

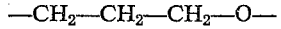

and from 0.5 to 50% of the repeating units are

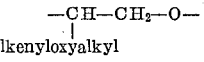

said copolymer having a weight average molecular weight of at least about 50,000.

6. A sulfur-vulcanizable copolymer in which from 50 to 99.5% of the repeating units are

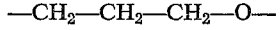

and from 0.5 to 50% of the repeating units are

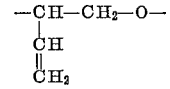

said copolymer having a weight average molecular weight of at least about 50,000.

7. A sulfur-vulcanizable copolymer in which from 50 to 99.5% of the repeating units are

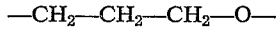

and from 0.5 to 50% of the repeating units are

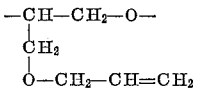

said copolymer having a weight average molecular weight of at least about 50,000.

8. A sulfur-vulcanizable copolymer in which from 50 to 99.5% of the repeating units are

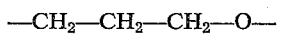

and from 0.5 to 50% of the repeating units are

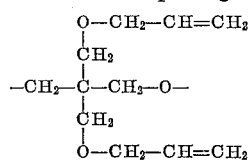

said copolymer having a weight average molecular weight of at least about 50,000.

9. A sulfur-vulcanizable copolymer in which from 50 to 99.5% of the repeating units are

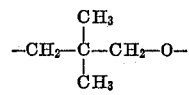

and from 0.5 to 50% of the repeating units are

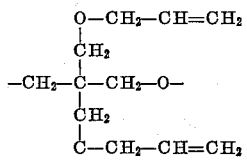

said copolymer having a weight average molecular weight of at least about 50,000.

10. A sulfur-vulcanizable copolymer in which from 0.5 to 50% of the repeating units are

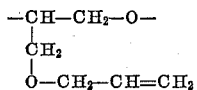

and the remainder of the repeating units is a mixture of
—CH$_2$—CH$_2$—CH$_2$—O— and

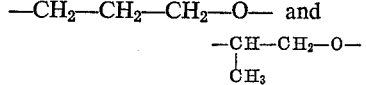

units, said copolymer having a weight average molecular weight of at least about 50,000.

References Cited by the Examiner

UNITED STATES PATENTS

| | | | |
|---|---|---|---|
| 2,870,100 | 1/59 | Stewart et al. | 260—2 |
| 2,891,837 | 6/59 | Campbell | 260—20 |
| 2,924,607 | 2/60 | Pattison | 260—88.3 |
| 2,933,480 | 4/60 | Gresham | 260—80.7 |
| 2,983,703 | 5/61 | D'Alelio | 260—88.3 |
| 3,031,439 | 4/62 | Bailey | 260—2 |
| 3,112,280 | 11/63 | Farthing | 260—20 |

JOSEPH L. SCHOFER, *Primary Examiner.*

LOUISE P. QUAST, WILLIAM H. SHORT, *Examiners.*